United States Patent
Semyanko et al.

(10) Patent No.: US 9,528,723 B2
(45) Date of Patent: Dec. 27, 2016

(54) PULSE WIDTH MODULATED MULTIPLE HEATER CONTROL

(71) Applicant: Hamilton Sundstrand Corporation, Windsor Locks, CT (US)

(72) Inventors: Andrew Semyanko, South Windsor, CT (US); William Tice, Windsor, CT (US); Gregory R. Leaper, Bloomfield, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 630 days.

(21) Appl. No.: 14/032,863

(22) Filed: Sep. 20, 2013

(65) Prior Publication Data
US 2015/0086185 A1    Mar. 26, 2015

(51) Int. Cl.
| | |
|---|---|
| F24H 3/02 | (2006.01) |
| F24D 13/00 | (2006.01) |
| F24H 9/20 | (2006.01) |
| B64D 11/04 | (2006.01) |
| B64D 13/08 | (2006.01) |
| B64D 13/06 | (2006.01) |

(52) U.S. Cl.
CPC ............. *F24H 9/2071* (2013.01); *B64D 11/04* (2013.01); *B64D 13/08* (2013.01); *F24H 3/022* (2013.01); *B64D 2013/0629* (2013.01)

(58) Field of Classification Search
None
See application file for complete search history.

(56) References Cited

U.S. PATENT DOCUMENTS

| | | | | |
|---|---|---|---|---|
| 3,594,546 A | * | 7/1971 | Smillie | G05D 23/1931 219/501 |
| 4,348,582 A | * | 9/1982 | Budek | H02J 13/0051 219/483 |
| 4,379,483 A | * | 4/1983 | Farley | G05D 23/24 165/240 |
| 4,559,441 A | * | 12/1985 | Rudich, Jr. | G05D 23/1912 219/483 |

(Continued)

FOREIGN PATENT DOCUMENTS

| | | |
|---|---|---|
| DE | 102011007817 A1 | 10/2012 |
| EP | 0855007 B1 | 11/2004 |
| WO | 2007/109829 A1 | 10/2007 |

OTHER PUBLICATIONS

The European Search Report mailed Feb. 11, 2015 for European Application No. 14184639.4.

*Primary Examiner* — Thor Campbell
(74) *Attorney, Agent, or Firm* — Kinney & Lange, P.A.

(57) ABSTRACT

A system includes, in one example, a first heater device, a second heater device, and a temperature sensor, each disposed within a fluid flow. The system further includes a controller communicatively coupled to the first heater device, the second heater device, and the temperature sensor. The controller is configured to receive, from the temperature sensor, an indication of a measured temperature of the fluid flow. The controller is further configured to control, based on a difference between the measured temperature of the fluid flow and a target temperature, operation of the first heater device via a first pulse width modulation signal and operation of the second heater device via a second pulse width modulation signal.

13 Claims, 2 Drawing Sheets

(56) References Cited

U.S. PATENT DOCUMENTS

| | | | | |
|---|---|---|---|---|
| 4,874,926 | A * | 10/1989 | Sanders | H02J 3/14 |
| | | | | 219/483 |
| 5,626,783 | A * | 5/1997 | Lee | G05D 23/24 |
| | | | | 219/483 |
| 5,866,880 | A | 2/1999 | Seitz et al. | |
| 6,080,971 | A * | 6/2000 | Seitz | F24H 9/2028 |
| | | | | 219/483 |
| 6,665,492 | B1 * | 12/2003 | Garcia | F24H 9/2071 |
| | | | | 156/499 |
| 6,940,050 | B2 * | 9/2005 | Probst | G05D 23/1951 |
| | | | | 219/205 |
| 7,472,695 | B2 | 1/2009 | Prust et al. | |
| 7,892,423 | B2 | 2/2011 | Rohde et al. | |
| 8,625,976 | B2 * | 1/2014 | Mulder | F24D 5/02 |
| | | | | 392/347 |
| 2004/0256377 | A1 | 12/2004 | Probst | |
| 2006/0006167 | A1 * | 1/2006 | Kopel | F24H 9/2071 |
| | | | | 219/494 |
| 2009/0189420 | A1 | 7/2009 | Bohlender et al. | |
| 2011/0233189 | A1 | 9/2011 | Reiss et al. | |
| 2012/0224839 | A1 * | 9/2012 | Zorzetto | F02M 53/06 |
| | | | | 392/485 |
| 2013/0043231 | A1 | 2/2013 | Won et al. | |

\* cited by examiner

PULSE WIDTH MODULATED MULTIPLE HEATER CONTROL

BACKGROUND

The present disclosure relates to heater control, and in particular to the control of multiple heaters via pulse width modulation.

Heaters are often used to heat fluids (e.g., air, liquids, etc.) to a target temperature. For example, in aircraft environmental control systems, a heater can be disposed within an airflow duct (e.g., an airflow duct of a galley heating system) to heat air passing through the duct to a zone of the aircraft. Often, a thermostat or other such controller receives a target temperature (e.g., via user input) and controls operation of the heater to achieve the target temperature based on feedback from a temperature sensor that measures a temperature of the air within the zone or duct. In some cases, such as in the case of a flow duct, a space within which the heater device is disposed can be limited. For instance, a heater disposed within a flow duct can encompass all or part of the available dimensions within which the heater can be installed. In such cases, it can be difficult to increase an amount of available heat to a system serviced by the heater because an increase in power output of a heater device is often accompanied by an increase in the size of the heater. Accordingly, it can be difficult to increase the amount of available heat without redesigning (e.g., enlarging) the flow duct within which the heater is installed. Such redesigns can be expensive and impractical to implement.

SUMMARY

In one example, a system includes a first heater device, a second heater device, and a temperature sensor, each disposed within a fluid flow. The system further includes a controller communicatively coupled to the first heater device, the second heater device, and the temperature sensor. The controller is configured to receive, from the temperature sensor, an indication of a measured temperature of the fluid flow. The controller is further configured to control, based on a difference between the measured temperature of the fluid flow and a target temperature, operation of the first heater device via a first pulse width modulation signal and operation of the second heater device via a second pulse width modulation signal.

In another example, a method includes receiving, by a controller from a temperature sensor, an indication of a measure temperature of a fluid flow. The method further includes controlling, by the controller and based on a difference between the measured temperature of the fluid flow and a target temperature, operation of a first heater device, disposed within the fluid flow, via a first pulse width modulation signal and operation of a second heater device, disposed within the fluid flow, via a second pulse width modulation signal.

DETAILED DESCRIPTION

According to techniques described herein, a heating system can control multiple heaters disposed in series within a fluid flow (e.g., airflow) to achieve a target temperature via separate pulse width modulation commands. A controller implementing techniques of this disclosure can control multiple heaters simultaneously using a coordinated series of separate pulse width modulation signals to each of the multiple heaters. For instance, the controller can control a duty cycle (e.g., expressed as a percentage of "on" time for a given period) of a first pulse width modulation signal to a first heater device to achieve a target temperature up to a first threshold duty cycle. Upon the first pulse width modulation signal reaching the first threshold duty cycle, if the target temperature has not yet been achieved, the controller can control a second pulse width modulation signal to a second heater device to achieve the target temperature up to a second threshold duty cycle while maintaining the first pulse width modulation signal at the first threshold duty cycle. Upon the second pulse width modulation signal reaching the second threshold duty cycle, the controller can control (e.g., increase, decrease, or maintain) the first pulse width modulation signal to achieve the target temperature while maintaining the second pulse width modulation signal at the second threshold duty cycle. In this way, a system implementing techniques of this disclosure can control multiple heaters disposed in series to achieve a target temperature while helping to minimize the possibility that any of the heaters will exceed a maximum load and/or heating capacity. Accordingly, techniques of this disclosure can enable multiple heaters to be disposed within confined spaces, such as air ducts within an aircraft, to increase an amount of heat that can be produced by the heating system.

Figure 1:
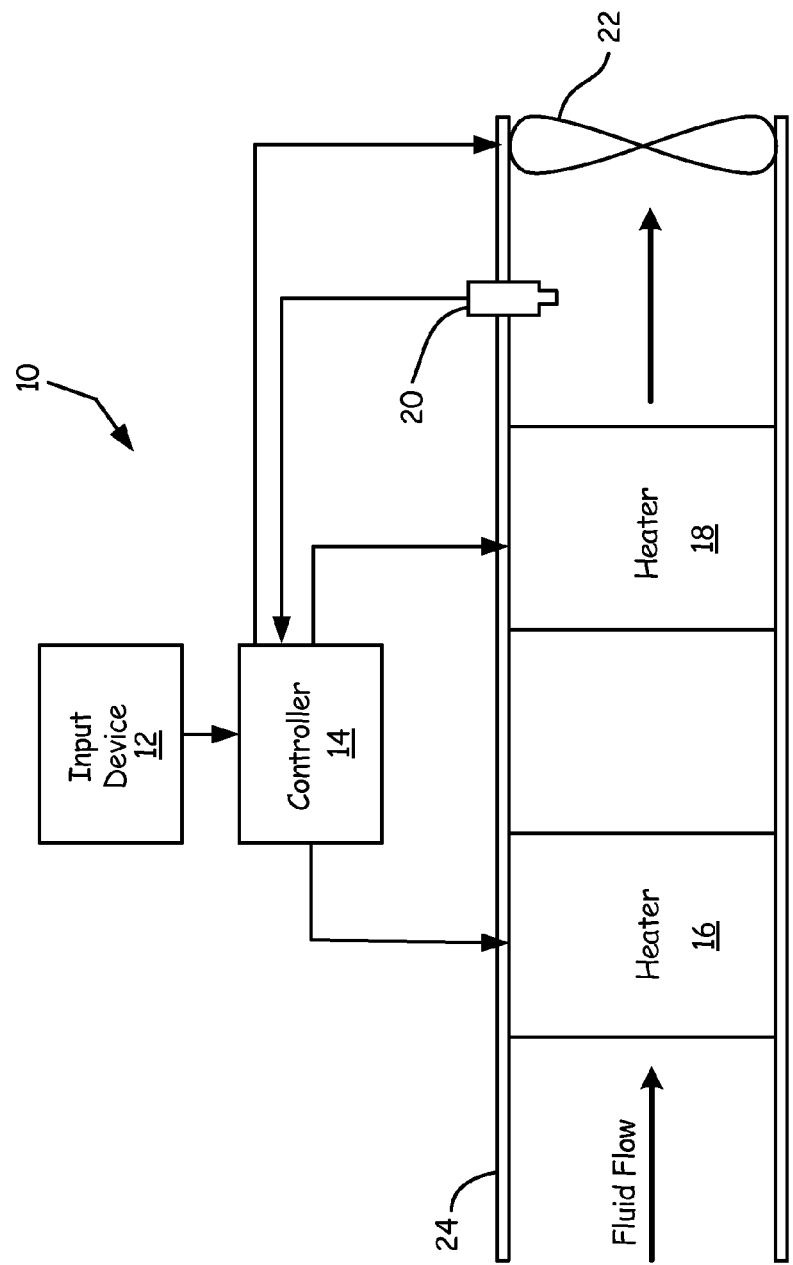
FIG. 1 is a schematic diagram of a fluid heating system.

FIG. 1 is a schematic diagram of system 10 that can control multiple heaters to achieve a target temperature, according to one or more aspects of this disclosure. As illustrated, system 10 can include input device 12, controller 14, first heater 16, second heater 18, temperature sensor 20, and fan 22. As further illustrated, first heater 16 and second heater 18 can be disposed in series within flow duct 24. For instance, second heater 18 can be disposed within a fluid flow (e.g., a fluid flow through flow duct 24) downstream of first heater 16, such that fluid (e.g., air, liquid such as water, etc.) flows through first heater 16 and is received by second heater 18. First heater 16 and second heater 18 can each be any type of heater device capable of heating a fluid as the fluid passes from an inlet region to an outlet region of the heater device. For instance, first heater 16 and second heater 18 can include one or more heater coils and/or heat exchangers that heat fluid, such as air, water, or other fluids as the fluid passes through the heater device.

As an example operation, system 10 can be a heating system that supplies heated air to a zone of an aircraft, such as a galley heating system. In such an example, ram air collected by the aircraft can be conditioned (e.g., by an air conditioning system that depressurizes and cools the ram air) and directed to a mixed manifold (not illustrated) that directs the conditioned air through flow duct 24 (e.g., a galley air duct in this example). The conditioned air flowing through flow duct 24 can thereby be directed through first heater 16 that is disposed within the airflow flowing through flow duct 24. Air passing through first heater 16 can be heated by first heater 16 and directed from first heater 16 to second heater 18 that can further heat the air as it passes through the heater. In some examples, as in the illustrated example of FIG. 1, system 10 can include fan 22 disposed within the fluid flow (e.g., proximate and/or within flow duct 24) to draw fluid through flow duct 24 and create, maintain, and/or increase a speed of the fluid flow through flow duct 24 (and therefore through first heater 16 and second heater 18). In other examples, such as in heating systems in which a pressure differential of the fluid creates a fluid flow from first heater 16 to second heater 18, system 10 may not include fan 22.

As illustrated, controller 14 can be communicatively coupled (e.g., via one or more of an electrical connection, a communication network(s), or other such communicative connection) to input device 12, first heater 16, second heater 18, temperature sensor 20, and fan 22. Controller 14 can be configured to receive inputs (e.g., electrical inputs, communicative inputs via one or more communication networks, etc.) from one or more components of system 10 (e.g., input device 12, first heater 16, second heater 18, temperature sensor 20, and fan 22) and control operation of the one or more components via the communicative connection(s). In some examples, controller 14 can be part of a supervisory system to monitor and control operational aspects of system 10. For instance, controller 14 can be part of an aircraft air conditioning system that supplies conditioned (e.g., heated, cooled, etc.) air to one or more zones and/or other systems and components of the aircraft. In other examples, controller 14 can be and/or be part of a separate device that receives inputs and controls operation of system 10.

In some examples, controller 14 can include one or more processing circuits (e.g., processors) and/or one or more computer-readable storage devices (e.g., computer-readable memory such as RAM). For instance, one or more processing circuits of controller 14 can be configured to implement functionality and/or process instructions, such as instructions stored within one or more computer-readable storage devices, for execution within controller 14. Examples of such processors and/or processing circuits can include, but are not limited to, any one or more of a microprocessor, a controller, a digital signal processor (DSP), an application specific integrated circuit (ASIC), a field-programmable gate array (FPGA), or other equivalent discrete or integrated logic circuitry.

Computer-readable storage devices of controller 14, in some examples, can be described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, the computer-readable storage devices of controller 14 can be a temporary memory, meaning that a primary purpose of the computer-readable storage devices is not long-term storage. In certain examples, the computer-readable storage devices of controller 14 can be volatile memory, meaning that the computer-readable storage devices do not maintain stored contents when power to controller 14 is turned off. Examples of volatile memories can include random access memories (RAM), dynamic random access memories (DRAM), static random access memories (SRAM), and other forms of volatile memories.

As illustrated in FIG. 1, controller 14 can be communicatively coupled to input device 12. Controller 14, in certain examples, can receive an indication of a target temperature from input device 12. Accordingly, input device 12 can be any device capable of outputting an indication of a target temperature, such as a thermostat, a computing device including a processor (e.g., a microprocessor), and the like. As one example, input device 12 can be a thermostat device that can receive user input indicative of a target temperature and transmit an indication of the target temperature (e.g., a voltage, a digital signal, etc.) to controller 14.

As further illustrated in FIG. 1, controller 14 can be communicatively coupled to temperature sensor 20 disposed within the fluid flow passing through first heater 16 and second heater 18 (e.g., via flow duct 24). Temperature sensor 20 can be any sensor capable of measuring a temperature of a fluid (e.g., air, liquid, etc.) within which temperature sensor 20 is disposed and outputting an indication of the measured temperature (e.g., a voltage indicative of the temperature, a digital signal indicative of the temperature, or other such signals).

According to techniques of this disclosure, controller 14 can be configured to control operation of first heater 16 and second heater 18 based at least in part on a difference between a measured temperature received from temperature sensor 20 and a target temperature (e.g., received from input device 12). For example, controller 14 can control operation of first heater 16 via a first pulse width modulation signal and operation of second heater 18 via a second pulse width modulation signal, as is further described below.

A pulse width modulation signal can be a control signal (e.g., an electrical control signal, such as a voltage) that modulates (e.g., switches) between an "on" state and an "off" state. For instance, an "on" state can correspond to a non-zero voltage, and an "off" state can correspond to a voltage having a value of zero. A duty cycle of a pulse width modulation signal can be expressed as a percentage of "on" time of the signal for each period of the signal (e.g., one tenth of one second, one half of one second, one second, or other periods). For instance, a fifty-percent duty cycle can correspond to a pulse width modulation signal having an "on" state for fifty percent of a period of the signal, and hence, an "off" state for the remaining fifty percent of the period of the signal. Similarly, a thirty-percent duty cycle can correspond to a pulse width modulation signal having an "on" state for thirty percent of a period of the signal and an "off" state for the remaining seventy percent of the period of the signal. Accordingly, a pulse width modulation signal having a fifty-percent duty cycle for a period of one second can correspond to an "on" state for one half of one second and an "off" state for the remaining half of the second. Similarly, a pulse width modulation signal having a thirty-percent duty cycle for a period of one second can correspond to an "on" state for three-tenths of one second and an "off" state for the remaining seven-tenths of the second.

In operation, controller 14 can receive an indication of a target temperature (e.g., seventy-five degrees Fahrenheit) from input device 12, and can control operation of first heater 16 via a first pulse width modulation signal and operation of second heater 18 via a second, different pulse width modulation signal based on a difference between a measured temperature received from temperature sensor 20 and the target temperature. For instance, controller 14 can control operation of first heater 16 via the first pulse width modulation signal to achieve the target temperature up to a first threshold duty cycle (e.g., a fifty-percent duty cycle) while maintaining the second pulse width modulation signal (to second heater 18) at a duty cycle of zero (i.e., a full-off duty cycle corresponding to a zero-percent "on" state). Rather than increase the duty cycle of the first pulse width modulation signal to a duty cycle that is greater than the first threshold duty cycle, controller 14 can control operation of second heater 18 via the second pulse width modulation signal to achieve the target temperature while maintaining the first pulse width modulation signal at the first threshold duty cycle. In this way, controller 14 can decrease the average electrical load of first heater 16 and second heater 18 while controlling both first heater 16 and second heater 18 to achieve the target temperature. Similarly, upon second heater 18 achieving a second threshold duty cycle (e.g., a seventy-percent duty cycle, a one hundred percent duty cycle, or other threshold duty cycle), controller 14 can control (e.g., increase) the duty cycle of the first pulse width modulation signal to first heater 16 to achieve the target temperature while maintaining the second pulse width modulation signal at the second threshold duty cycle. Accordingly, controller 14 can control both first heater 16 and second heater 18 via separate pulse width modulation signals to achieve the target temperature while helping to minimize the possibility that either of first heater 16 and second heater 18 will achieve a maximum load and/or heating capacity.

While the example of FIG. 1 has been illustrated with respect to two heater devices (i.e., first heater 16 and second heater 18), in other examples, system 10 can include more than two heater devices, such as three, five, ten, or other numbers of heater devices. In such examples, controller 14 can control operation of each of the multiple heater devices via separate pulse width modulation signals to each of the heater devices to achieve a target temperature. In this way, techniques of this disclosure can enable system 10 to increase an amount of heat supplied by system 10 by increasing a number of heater devices included in the system while helping to ensure that none of the heater devices exceed a maximum electrical load and/or heating capacity. Accordingly, a system implementing techniques described herein can utilize multiple heater devices to increase a producible amount of heat of the system in cases where it may be impractical or impossible to increase a size or heating output of any one of the heater devices.

Figure 2:
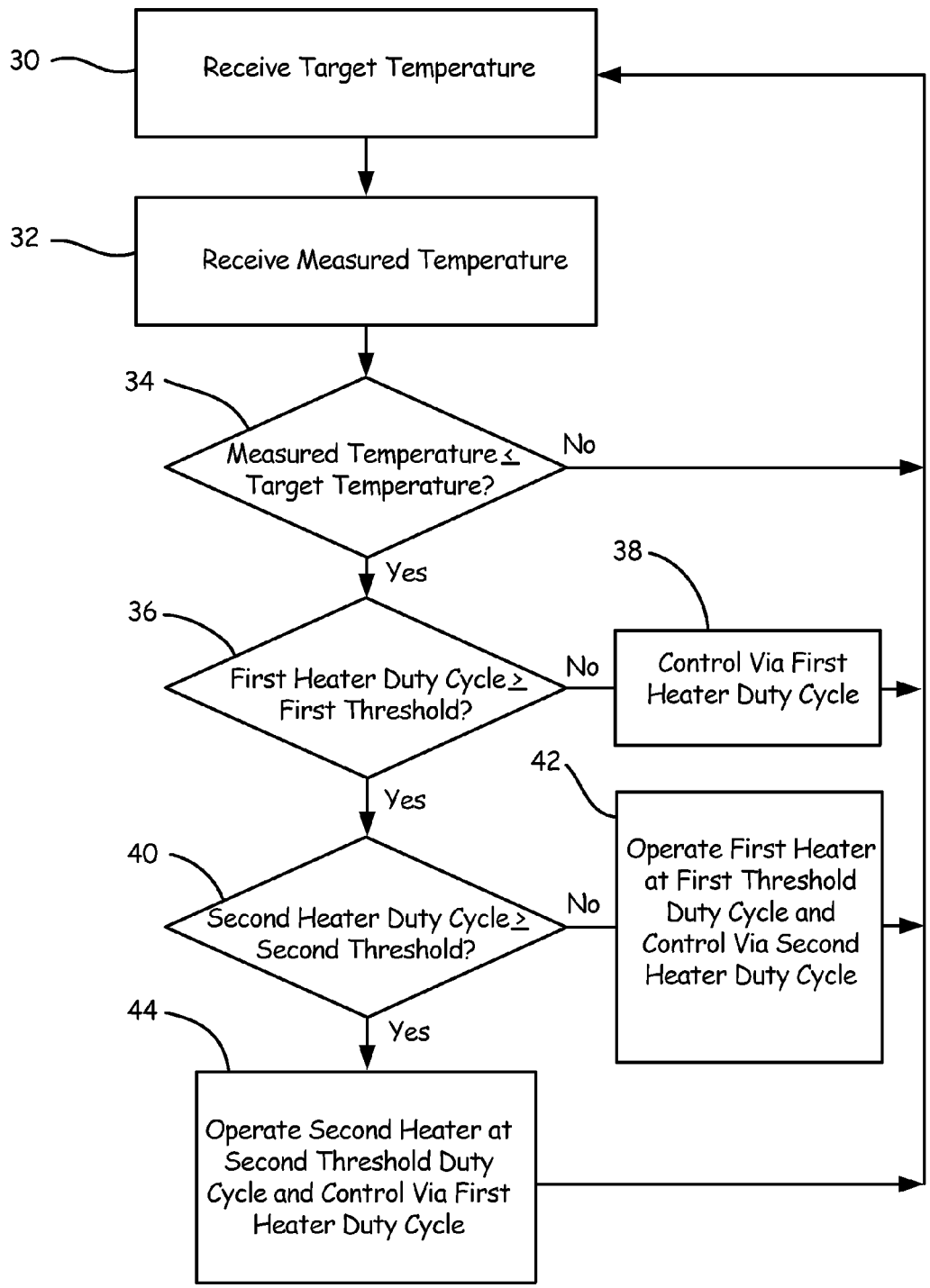
FIG. 2 is a flow diagram illustrating example operations of a fluid heating system to control multiple heater devices.

FIG. 2 is a flow diagram illustrating example operations of a fluid heating system to control multiple heater devices, according to one or more aspects of this disclosure. For purposes of illustration, the example operations are described below within the context of system 10 as shown in FIG. 1.

A target temperature can be received (30). For example, controller 14, including one or more processing circuits (e.g., processors) and/or computer-readable storage devices, can receive a signal (e.g., a voltage signal, a digital and/or analog signal, or other signal) from input device 12 that is indicative of a target temperature (e.g., seventy degrees Fahrenheit, seventy-five degrees Fahrenheit, twenty-two degrees Celsius, or other target temperatures). An indication of a measured temperature can be received (32). For instance, temperature sensor 20 can be disposed within a fluid flow. Controller 14 can receive an indication of a measured temperature of the fluid flow (e.g., a voltage, a current, a digital signal, etc.) via a communicative connection with temperature sensor 20.

It can be determined whether the measured temperature is less than (or equal to) the target temperature (34). For instance, controller 14 can determine, based on the received indications of the measured temperature and the target temperature, whether the measured temperature is less than (or equal to) the target temperature. Where the measured temperature is not less than (or equal to) the target temperature ("NO" branch of 34), the target temperature can continue to be received. For instance, controller 14 can determine, based on the determination that the measured temperature is not less than (or equal to) the target temperature, that no heater activation is required.

In examples where the measured temperature is less than (or equal to) the target temperature ("YES" branch of 34), it can be determined whether a duty cycle of a first pulse width modulation signal is greater than (or equal to) a first threshold duty cycle (36). As an example, controller 14 can compare a duty cycle (e.g., expressed as a percentage of time of an "on" state of a pulse width modulation signal for a period of the signal) of a first pulse width modulation signal for controlling (e.g., supplying a voltage and/or current, energizing a circuit that supplies a voltage and/or current, etc.) first heater 16 to a first threshold duty cycle, such as a twenty-percent duty cycle, a fifty-percent duty cycle, a seventy-percent duty cycle, or other threshold duty cycles.

In examples where the duty cycle of the first pulse width modulation signal is not greater than (or equal to) the first threshold duty cycle ("NO" branch of 36), the duty cycle of the first pulse width modulation signal can be controlled (e.g., increased, decreased, or maintained) to achieve the target temperature (38). In some examples, the duty cycle of the first pulse width modulation signal can be controlled to achieve the target temperature while the second pulse width modulation signal (e.g., to control second heater 18) is maintained at a duty cycle of zero. As an example, controller 14 can increase, in response to determining that the measured temperature is less than the target temperature, a duty cycle of the first pulse width modulation signal to first heater 16 to achieve the target temperature. For instance, controller 14 can increase the duty cycle incrementally for each period of time during which the measured temperature is less than the target temperature until the measured temperature is greater than (or equal to) the target temperature. In some examples, controller 14 can control (e.g., increase, decrease, or maintain) the duty cycle based on a difference between the measured temperature and the target temperature (e.g., proportionally to the difference). In certain examples, controller 14 can control the duty cycle based on one or more signals derived from one or more of the measured temperature, the target temperature, and the difference between the measured temperature and the target temperature. For instance, such derived signals can include a first derivative (e.g., with respect to time) a second derivative (e.g., with respect to time), an integral (e.g., with respect to time), or other such signals. As one example, controller 14 can control (e.g., increase, decrease, or maintain) the duty cycle of the first pulse width modulation signal using a proportional-integral-derivative (PID) control algorithm. In general, controller 14 can control the duty cycle of the first pulse width modulation signal using any control algorithm and/or signal processing (e.g., digital filters, analog and/or hardware filters, etc.) to achieve the target temperature.

In examples where the duty cycle of the first pulse width modulation signal is greater than (or equal to) the first threshold duty cycle ("YES" branch of 36), it can be determined whether a duty cycle of a second pulse width modulation signal is greater than (or equal to) a second threshold duty cycle (40). For instance, upon the duty cycle of the first pulse width modulation signal reaching the first threshold duty cycle, controller 14 can compare a duty cycle of a second pulse width modulation signal to control second heater 18 to a second threshold duty cycle, such as a twenty-percent duty cycle, a fifty-percent duty cycle, a seventy-percent duty cycle, one hundred percent, or other threshold duty cycles.

In examples where the duty cycle of the second pulse width modulation signal is not greater than (or equal to) the second threshold duty cycle ("NO" branch of 40), the duty cycle of the second pulse width modulation signal can be controlled to achieve the target temperature (42). In certain examples, the duty cycle of the second pulse width modulation signal can be controlled to achieve the target temperature while the duty cycle of the first pulse width modulation signal is maintained at the first threshold duty cycle (e.g., a fifty-percent duty cycle). For example, controller 14 can control (e.g., increase, decrease, or maintain) the duty cycle of the second pulse width modulation signal to second heater 18 via one or more control algorithms (e.g., a PID control algorithm, or other control algorithms) to achieve the target temperature. For instance, in response to determining that the measured temperature is less than the target temperature, controller 14 can control the duty cycle of the second pulse width modulation signal based at least in part on the difference between the measured temperature and the target temperature while maintaining the duty cycle of the first pulse width modulation signal (e.g., to first heater 16) at the first threshold duty cycle (e.g., a fifty-percent duty cycle).

In examples where the duty cycle of the second pulse width modulation signal is greater than (or equal to) the second threshold duty cycle ("YES" branch of 40), the duty cycle of the first pulse width modulation signal can be controlled to achieve the target temperature (44). In some examples, the duty cycle of the first pulse width modulation signal can be controlled to achieve the target temperature while the duty cycle of the second pulse width modulation signal is maintained at the second threshold duty cycle. For instance, controller 14 can control the duty cycle of the first pulse width modulation signal to first heater 16 (e.g., via one or more control algorithms) while maintaining the duty cycle of the second pulse width modulation signal to second heater 18 at the second threshold duty cycle (e.g., a one hundred percent duty cycle).

While the example operations of FIG. 2 are illustrated and described as including two threshold duty cycles (i.e., the first threshold duty cycle and the second threshold duty cycle) corresponding to two heater devices (i.e., first heater 16 and second heater 18), other example operations can include more or fewer than two threshold duty cycles and/or heater devices. For instance, in some examples, the operations can include a comparison of pulse width modulation signals and/or operation of one or more of the heater devices to two, three, five, ten, or more threshold duty cycles. As an example, upon the first pulse width modulation signal reaching a third threshold duty cycle (i.e., subsequent to operation 44 of FIG. 2), controller 14 can control the second pulse width modulation signal to second heater 18 to achieve the target temperature up to a fourth threshold duty cycle while maintaining the first pulse width modulation signal at the third threshold duty cycle. Similarly, controller 14 can control multiple (e.g., three, five, ten, or more) heater devices utilizing separate pulse width modulation signals to each of the multiple heater devices. In this way, techniques described herein can enable a system to include multiple heater devices (e.g., disposed in series) to increase a total amount of heat that can be produced by the system while helping to minimize the possibility that any of the multiple heater devices will reach a maximum load and/or heating capacity. Accordingly, a system implementing techniques of this disclosure can be utilized to increase an amount of available heat that can be produced by a heating system without increasing the size and/or heating power of any one of the heating devices.

The following are non-exclusive descriptions of embodiments of the present disclosure.

A system includes a first heater device, a second heater device, and a temperature sensor, each disposed within a fluid flow. The system further includes a controller communicatively coupled to the first heater device, the second heater device, and the temperature sensor. The controller is configured to receive, from the temperature sensor, an indication of a measured temperature of the fluid flow. The controller is further configured to control, based on a difference between the measured temperature of the fluid flow and a target temperature, operation of the first heater device via a first pulse width modulation signal and operation of the second heater device via a second pulse width modulation signal.

The system of the preceding paragraph can optionally include, additionally and/or alternatively, any one or more of the following features, configurations, and/or additional components:

The first heater device and the second heater device can be disposed in series within a flow duct.

The second heater can be disposed downstream of the first heater within the fluid flow.

The controller can be configured to control the operation of the first heater device via the first pulse width modulation signal and the operation of the second heater device via the second pulse width modulation signal by at least being configured to: increase, in response to determining that the measured temperature of the fluid flow is less than the target temperature, a duty cycle of the first pulse width modulation signal up to a first threshold duty cycle while maintaining the second pulse width modulation signal at a duty cycle of zero; and upon the first pulse width modulation signal reaching the first threshold duty cycle, increase, in response to determining that the measured temperature of the fluid flow is less than the target temperature, a duty cycle of the second pulse width modulation signal up to a second threshold duty cycle while maintaining the first pulse width modulation signal at the first threshold duty cycle.

The controller can be further configured to control the operation of the first heater device via the first pulse width modulation signal and the operation of the second heater device via the second pulse width modulation signal by at least being configured to: upon the second pulse width modulation signal reaching the second threshold duty cycle, increase, in response to determining that the measured temperature of the fluid flow is less than the target temperature, the duty cycle of the first pulse width modulation signal while maintaining the second pulse width modulation signal at the second threshold duty cycle.

The first threshold duty cycle can be a fifty percent duty cycle. The second threshold duty cycle can be a one hundred percent duty cycle.

The system can further include an input device communicatively coupled to the controller. The controller can be configured to receive the target temperature from the input device.

The fluid flow can be air flow.

A method includes receiving, by a controller from a temperature sensor, an indication of a measure temperature of a fluid flow. The method further includes controlling, by the controller and based on a difference between the measured temperature of the fluid flow and a target temperature, operation of a first heater device, disposed within the fluid flow, via a first pulse width modulation signal and operation of a second heater device, disposed within the fluid flow, via a second pulse width modulation signal.

The method of the preceding paragraph can optionally include, additionally and/or alternatively, any one or more of the following operations, features, configurations, and/or additional components:

The first heater device and the second heater device can be disposed in series within a flow duct.

The second heater can be disposed downstream of the first heater within the fluid flow.

Controlling the operation of the first heater device via the first pulse width modulation signal and the operation of the second heater device via the second pulse width modulation signal can include: increasing, by the controller and in response to determining that the measured temperature of the fluid flow is less than the target temperature, a duty cycle of the first pulse width modulation signal up to a first threshold duty cycle while maintaining the second pulse width modulation signal at a duty cycle of zero; and upon the first pulse width modulation signal reaching the first threshold duty cycle, increasing, by the controller and in response to determining that the measured temperature of the fluid flow is less than the target temperature, a duty cycle of the second pulse width modulation signal up to a second threshold duty cycle while maintaining the first pulse width modulation signal at the first threshold duty cycle.

Controlling the operation of the first heater device via the first pulse width modulation signal and the operation of the second heater device via the second pulse width modulation signal further can further include: upon the second pulse width modulation signal reaching the second threshold duty cycle, increasing, by the controller and in response to determining that the measured temperature of the fluid flow is less than the target temperature, the duty cycle of the first pulse width modulation signal while maintaining the second pulse width modulation signal at the second threshold duty cycle.

The first threshold duty cycle can be a fifty percent duty cycle. The second threshold duty cycle can be a one hundred percent duty cycle.

The method can further include receiving, by the controller and from an input device, the target temperature.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system comprising:
   a first heater device, a second heater device, and a temperature sensor, each disposed within a fluid flow; and
   a controller communicatively coupled to the first heater device, the second heater device, and the temperature sensor, the controller configured to:
      receive, from the temperature sensor, an indication of a measured temperature of the fluid flow; and
      control, based on a difference between the measured temperature of the fluid flow and a target temperature, operation of the first heater device via a first pulse width modulation signal and operation of the second heater device via a second pulse width modulation signal by at least being configured to:
         increase, in response to determining that the measured temperature of the fluid flow is less than the target temperature, a duty cycle of the first pulse width modulation signal up to a first threshold duty cycle while maintaining the second pulse width modulation signal at a duty cycle of zero; and
         upon the first pulse width modulation signal reaching the first threshold duty cycle, increase, in response to determining that the measured temperature of the fluid flow is less than the target temperature, a duty cycle of the second pulse width modulation signal up to a second threshold duty cycle while maintaining the first pulse width modulation signal at the first threshold duty cycle.

2. The system of claim 1, wherein the first heater device and the second heater device are disposed in series within a flow duct.

3. The system of claim 1, wherein the second heater is disposed downstream of the first heater within the fluid flow.

4. The system of claim 1, wherein the controller is further configured to control the operation of the first heater device via the first pulse width modulation signal and the operation of the second heater device via the second pulse width modulation signal by at least being configured to:
   upon the second pulse width modulation signal reaching the second threshold duty cycle, increase, in response to determining that the measured temperature of the fluid flow is less than the target temperature, the duty cycle of the first pulse width modulation signal while maintaining the second pulse width modulation signal at the second threshold duty cycle.

5. The system of claim 1,
   wherein the first threshold duty cycle comprises a fifty percent duty cycle, and
   wherein the second threshold duty cycle comprises a one hundred percent duty cycle.

6. The system of claim 1, further comprising:
   an input device communicatively coupled to the controller, wherein the controller is configured to receive the target temperature from the input device.

7. The system of claim 1, wherein the fluid flow comprises air flow.

8. A method comprising:
   receiving, by a controller from a temperature sensor, an indication of a measured temperature of a fluid flow; and
   controlling, by the controller and based on a difference between the measured temperature of the fluid flow and a target temperature, operation of a first heater device, disposed within the fluid flow, via a first pulse width modulation signal and operation of a second heater device, disposed within the fluid flow, via a second pulse width modulation signal, the controlling comprising:
      increasing, by the controller and in response to determining that the measured temperature of the fluid flow is less than the target temperature, a duty cycle of the first pulse width modulation signal up to a first threshold duty cycle while maintaining the second pulse width modulation signal at a duty cycle of zero; and
      upon the first pulse width modulation signal reaching the first threshold duty cycle, increasing, by the controller and in response to determining that the measured temperature of the fluid flow is less than the target temperature, a duty cycle of the second pulse width modulation signal up to a second threshold duty cycle while maintaining the first pulse width modulation signal at the first threshold duty cycle.

9. The method of claim 8, wherein the first heater device and the second heater device are disposed in series within a flow duct.

10. The method of claim 8, wherein the second heater is disposed downstream of the first heater within the fluid flow.

11. The method of claim 8, wherein controlling the operation of the first heater device via the first pulse width modulation signal and the operation of the second heater device via the second pulse width modulation signal further comprises:
   upon the second pulse width modulation signal reaching the second threshold duty cycle, increasing, by the controller and in response to determining that the measured temperature of the fluid flow is less than the target temperature, the duty cycle of the first pulse width modulation signal while maintaining the second pulse width modulation signal at the second threshold duty cycle.

12. The method of claim 8,
   wherein the first threshold duty cycle comprises a fifty percent duty cycle, and
   wherein the second threshold duty cycle comprises a one hundred percent duty cycle.

13. The method of claim 8, further comprising:
   receiving, by the controller and from an input device, the target temperature.

* * * * *